(12) United States Patent
White et al.

(10) Patent No.: US 6,301,012 B1
(45) Date of Patent: *Oct. 9, 2001

(54) AUTOMATIC CONFIGURATION OF A NETWORK PRINTER

(75) Inventors: Craig R. White, Eagle, ID (US); Shivaun Albright, Rocklin, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,088

(22) Filed: Apr. 24, 1998

(51) Int. Cl.[7] ............... B41B 15/00; G06F 3/00; G06Y 9/24; G06Y 1/24
(52) U.S. Cl. ............... 358/1.15; 709/221; 710/10; 713/1; 713/100
(58) Field of Search ............... 358/1.15, 1.16, 358/1.6, 1.14, 442; 709/220, 221; 710/10, 104; 713/1, 100

(56) References Cited

U.S. PATENT DOCUMENTS

| | | | |
|---|---|---|---|
| 5,564,109 | 10/1996 | Snyder et al. | 395/828 |
| 5,580,177 | 12/1996 | Gase et al. | 400/61 |
| 5,655,148 | 8/1997 | Richman et al. | 395/828 |
| 5,687,320 | 11/1997 | Wiley et al. | 395/200.16 |
| 5,692,111 | * 11/1997 | Marbury et al. | 395/114 |
| 5,832,191 | * 11/1998 | Thorne | 395/114 |
| 6,029,238 | * 2/2000 | Furukawa | 709/220 |
| 6,112,256 | * 8/2000 | Goffinet et al. | 709/221 |
| 6,138,178 | * 10/2000 | Watanabe | 713/1 |

FOREIGN PATENT DOCUMENTS

| | | | |
|---|---|---|---|
| 8-328776 | * 12/1996 | (JP) | G06F/3/12 |
| 10-63451 | * 3/1998 | (JP) | G06F/3/12 |
| 10-181158 | * 7/1998 | (JP) | B41J/29/38 |
| 11-296325 | * 10/1999 | (JP) | G06F/3/12 |

OTHER PUBLICATIONS

European Search Report.
U.S. Patent application Ser. No. 08/847,211, filed Apr. 30, 1997, pending; Title: Method And Apparatus For Automatically Enabling Communication With A Network Printer.
English Translation of JP10–63451; published Mar. 1998; inventor Hiroki Kobayashi.

* cited by examiner

Primary Examiner—Kimberly A. Williams
(74) Attorney, Agent, or Firm—Lane R. Simmons

(57) ABSTRACT

A method of configuring a peripheral device on a network without user intervention includes a server node receiving identification data for identifying the peripheral device on the network and, if the peripheral device is a new device on the network or a driver for the peripheral device is not registered on the server node, the server node self-installing the driver for the peripheral device. As such, newly connected peripheral devices are automatically seen on a network and a driver for the peripheral device is automatically configured on a print server without any user intervention. Additionally, a communication port and queue for the device are also automatically created. Moreover, device configurations are dynamically and automatically updated on the print server for consistent, accurate network information.

23 Claims, 3 Drawing Sheets

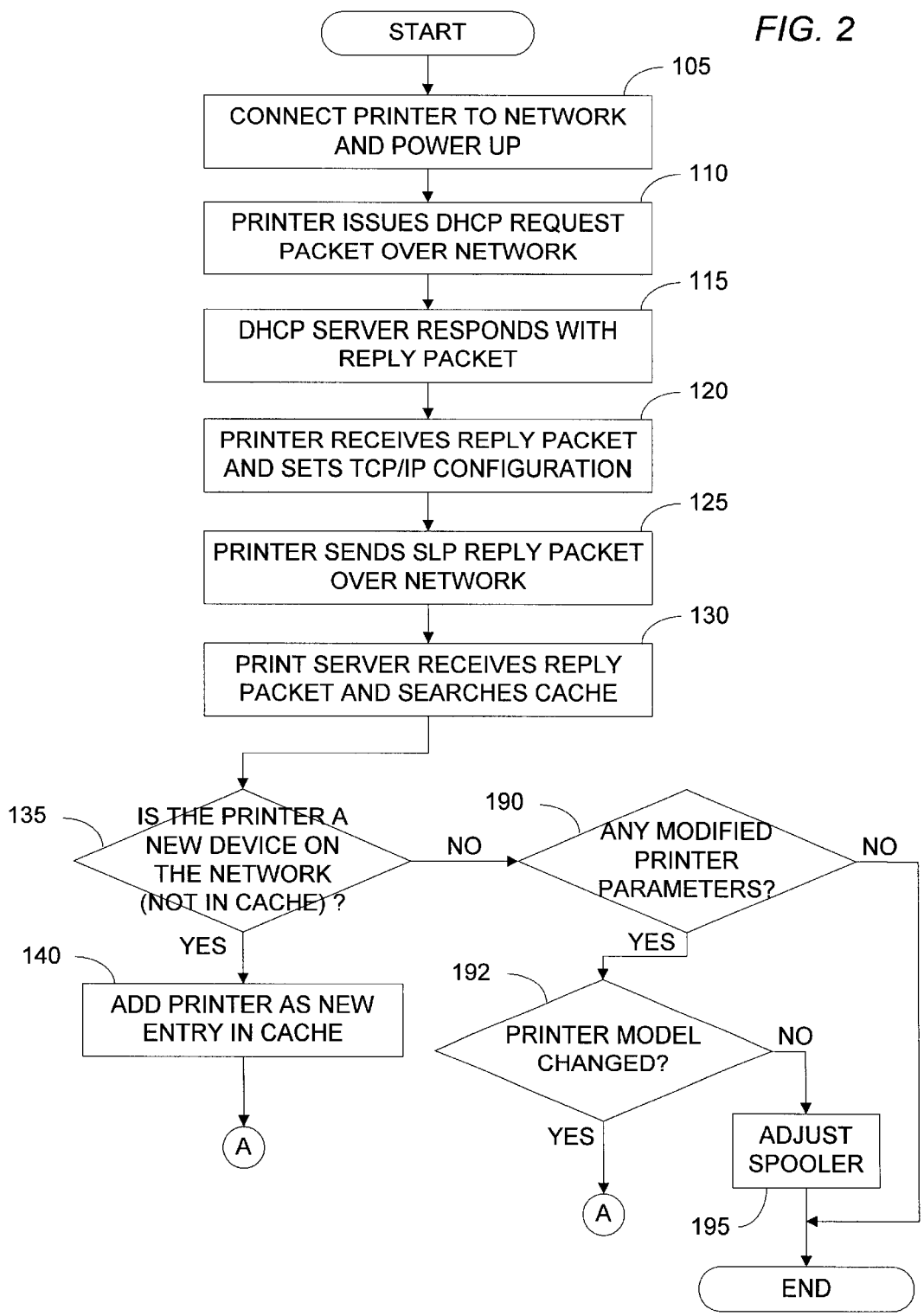

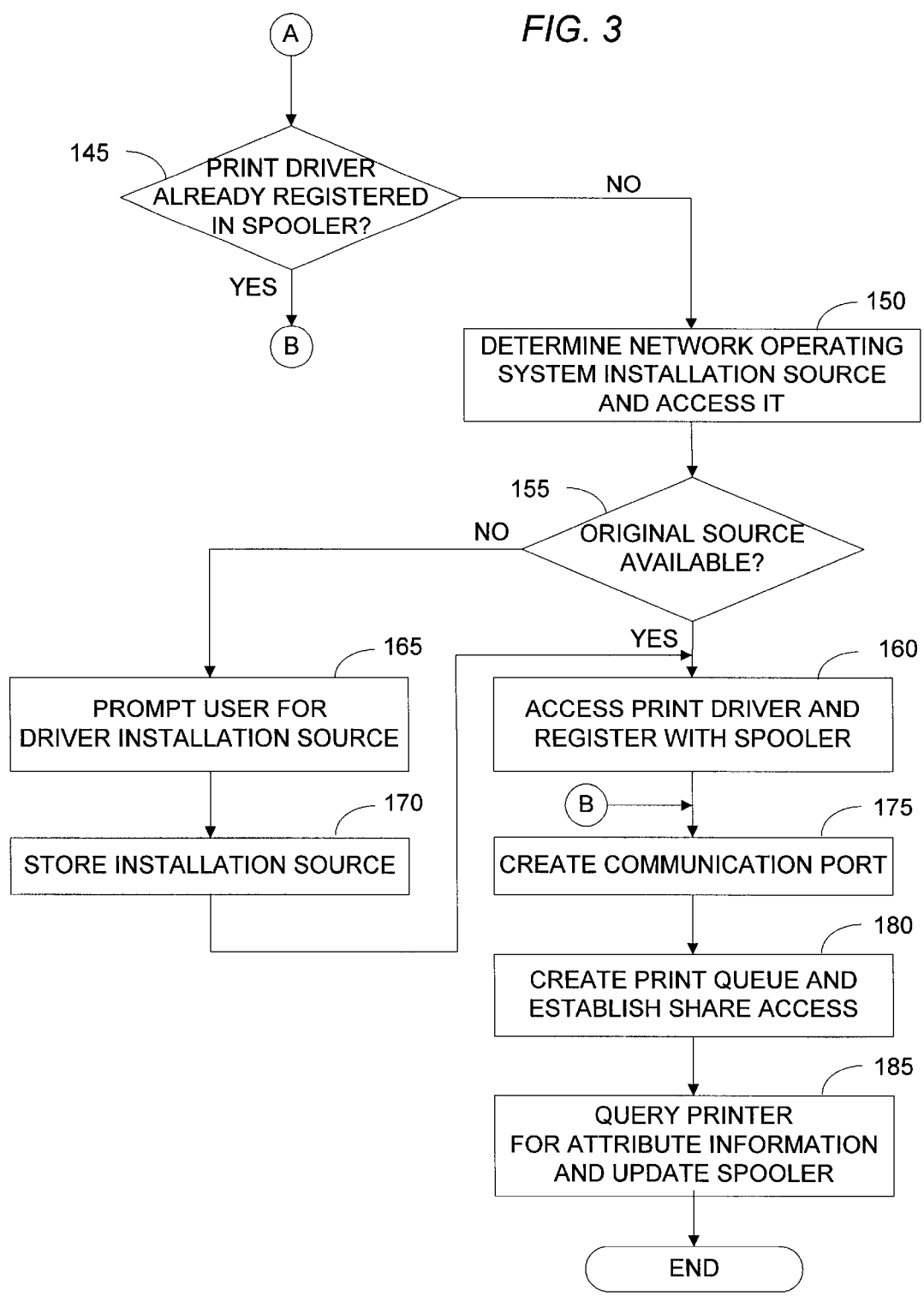

AUTOMATIC CONFIGURATION OF A NETWORK PRINTER

FIELD OF THE INVENTION

This invention relates in general to network communications and, more particularly, to enabling network peripheral devices such as printers to be automatically configured without user intervention upon connection to a network.

BACKGROUND OF THE INVENTION

Enabling a user to employ a newly added printer over a network is often a complex task. At an overview level, initial set-up in current network environments generally requires the creation of print queues, printer objects and print servers. Then, such queues, objects and print servers must be properly linked and configured. Then, to send a print job to the network printer, the client processor usually directs the print job to a network queue on the print server, and then the print server processes the job from the queue and sends it to the printer.

More specifically, adding a printer to a network environment is, conventionally, no small task. It requires a series of installation and configuration steps that are generally performed either by a user or a network administrator or both in cooperation with each other. Namely, the printer requires specific configuration steps to be performed and parameters to be applied for successful operation on the network, as also does any computer (client processor) on the network that will be sending data to the printer. For example, typically, a vendor's configuration application program must be executed on a client computer to identify the new printer (device) to be used on the network. Once the new printer is identified from a list of devices presented by the vendor's configuration application, then the configuration application provides proper configuration parameters for that new device. The configuration parameters are very specific to the device being added and to the client computer and network over which communication occurs.

Additionally, a print server must be configured to enable use of the newly added printer on the network. Conventionally, the print server manages and monitors use of the printer relative to all client computers on the network, and all client computers access the printer via the print server. Accordingly, the print server must also be configured, in addition to the client computer, to enable use of the printer over the network. This includes, typically, a vendor's configuration application also being executed on the print server for that printer.

In addition to a vendor's configuration application being executed to install and configure the printer on the print server, the network operating system must also execute its configuration routines on the print server in order to configure and enable the printer for the network via the print server. This often includes identifying appropriate printer files, registering the printer with the spooling system, establishing printer queues and printer ports, and defining client processor network share-access rights to the printer. Unfortunately, the vendor configuration application and the network operating system configuration routines are generally not integrated, and must also be accessed directly from the print server itself. Thus, a network administrator conventionally manually initiates this software configuration process for the newly added printer from the print server itself.

While such a conventional network printer configuration system and method works well, when properly configured, it is more complex and cumbersome than what most users care to engage in. In addition, if the installation or configuration doesn't work quite right, troubleshooting can be both difficult and time-consuming.

Accordingly, an object of the present invention is to enable a peripheral device, such as a printer, to be automatically configured without user intervention upon connection to a network.

SUMMARY OF THE INVENTION

According to principles of the present invention in a preferred embodiment, a method of configuring a peripheral device on a network without user intervention includes the server node receiving identification data for identifying the peripheral device on the network and, if the peripheral device is a new device on the network or a driver for the peripheral device is not registered on the server node, the server node self-installing the driver for the peripheral device.

Thus, newly connected peripheral devices are automatically seen on a network and a driver for the peripheral device is automatically configured on a server node without any user intervention. Additionally, a communication port and queue for the device are also automatically created. Moreover, device configurations are dynamically and automatically updated on the server for consistent, accurate network information.

Other objects, advantages, and capabilities of the present invention will become more apparent as the description proceeds.

DESCRIPTION OF THE DRAWINGS

FIGS. 2–3 are flow charts depicting a preferred method of the present invention.

DETAILED DESCRIPTION OF THE INVENTION

Figure 1:
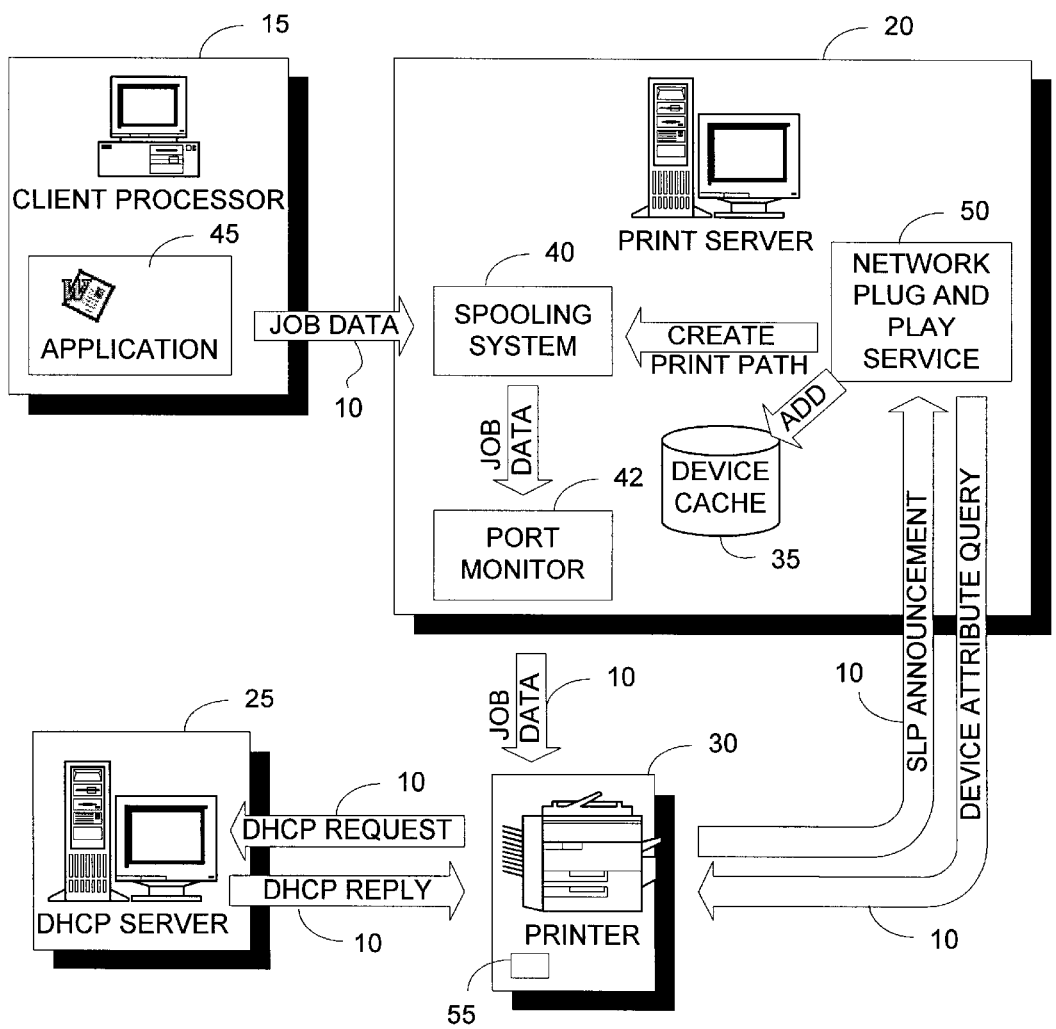
FIG. 1 is a block diagram of a communication network and attached devices and includes the present invention for automatically configuring a network printer.

FIG. 1 is a high level block diagram of a communication network 10 and attached devices including a client processor 15, print server 20, DHCP server 25, and network printer 30. The present invention is described in the context of communication network 10 being a conventional TCP/IP network. In the diagram, network 10 is illustrated as directional arrows to represent the TCP/IP communication links and data flow paths between each of the devices over the network in association with the present invention. The present invention is further described herein in the context of client processor 15, print server 20 and DHCP server 25 employing the Windows® or Windows NT® operating system produced by Microsoft Corporation. However, the present invention is also applicable to other networking environments and operating systems. Additionally, although a laser printer 30 is disclosed herein for purposes of discussion, it is understood that it is merely exemplary and that the present invention is equally applicable to other network peripheral devices, including ink jet printers, digital copiers, facsimile machines, etc. Moreover, each device 15, 20 and 25 includes a conventional network input/output (I/O) card for enabling communications with network 10. Printer 30 also includes a "onventional" network I/O card for general network communications purposes, but it is modified per the present invention as will be discussed hereafter.

Print server 20 includes device cache memory 35, spooling system 40, and port monitor 42 as conventional in the art. Client processor 15 includes application software 45 as conventional in the art for sending a print job to printer 30. DHCP server 25 is a Dynamic Host Configuration Protocol (DHCP) server that holds TCP/IP configuration parameters available for printer 30 and/or other devices to be configured on network 10. DHCP server 25 is shown and discussed as a device that is physically separate from print server 20 for clarity of discussion and illustration. However, DHCP server 25 and print server 20 may be a single device having the separate functionalities combined therein.

Overall, the present invention enables printer 30 to be automatically configured on network 10 for use by client processor 15 after it (the printer) is physically connected to the network by a user. Specifically, "network plug and play" software 50 depicts a key component of the present invention and resides in a memory on print server 20. A co-existing "network plug and play" module 55 resides (as firmware) on the network I/O card in printer 30. Thus, the network I/O card on printer 30 is modified from a conventional network I/O card in that it includes the "network plug and play" module 55 of the present invention. These software routines (50,55) execute and interact to enable the automatic configuration of printer 20 without any user intervention after the printer is connected to the network.

Referring now to FIGS. 2–3 (in conjunction with FIG. 1), a flow chart describes the functionality and a preferred method of the present invention. First, 105 (FIG. 2), printer 30 is connected to the network 10 and turned on. Upon power up, printer 30 (module 55) issues a DHCP request packet 110 over network 10. DHCP server 25 responds with a DHCP reply packet 115 that contains the available TCP/IP configuration parameters for printer 30. Upon receiving those TCP/IP configuration parameters 120, printer 30 sets its memory configuration to reflect the parameters received. The printer now has its TCP/IP address.

Next, 125, module 55 of printer 30 sends a Service Location Protocol (SLP) reply packet using IP multicast over network 10. This SLP reply packet serves as an announcement that the printer is up and running on the network. The SLP reply packet contains information specific to printer 30, including the printer's hardware (network I/O card) address, TCP/IP address, printer model name, network I/O card name, and TCP/IP hostname.

When "network plug and play" service 50 receives the SLP packet data 130, it initiates a search of device cache 35 on print server 20 to determine whether printer 30 (as identified in the SLP reply packet data) is a new device on the network. If printer 30 is a new device 135 on the network (i.e., there is not an entry for printer 30 in cache 35), then it is added as a new entry 140 to cache 35. Additionally, and importantly, after adding printer 30 as a new entry to cache 35, "network plug and play" service 50 then installs the appropriate print driver for printer 35 onto printer server 20 based on the printer model provided in the SLP reply packet.

Automatically installing the appropriate print driver includes communicating 145 (FIG. 3) with spooling system 40 to see if the appropriate print driver is already registered therein. If it is not, the installation source (location) of the network operating system is determined 150 (i.e., from a saved location in the Windows and Windows NT operating systems) and then that installation source (i.e., local or remote disk drive) is accessed in an attempt to automatically obtain the print driver. If the original disk that was used to install the network operating system is available at the source location 155 (i.e., in the drive), then the appropriate print driver for printer 30 is accessed 160 and registered with spooling system 40. Thus, the print driver installation is completely automated by "network plug and play" software 50, 55 of the present invention.

Only if the original disk does not exist at the determined source location 150, 155 will a user be prompted for input 165 to identify the location of the installation disk. However, this prompting only occurs once because the "network plug and play" module subsequently stores 170 the user input source location. As such, upon a next attempt to install another printer, the newly identified installation location is automatically accessed for obtaining the appropriate print driver. Then, only if the installation disk is not in that location will another prompt occur for user input to identify a new installation location.

Subsequent to accessing the print driver 150, 155, 160 and registering it with spooling system 40, "network plug and play" software 50 then creates a communication port 175 on print server 20 using the hostname from the SLP reply packet or a generated port name based on the hardware address of the device. Additionally, a print queue is created 180 on print server 20 using a unique name based on the model name of printer 30 (supplied in the SLP reply packet). The print queue is then designated with network share access rights 180 so client processor 15 can use printer 30 over network 10.

Finally, after basic communication and configuration parameters have been established, "network plug and play" software 50 then queries printer 30 for additional attribute information 185, such as how much memory the printer has, text describing the printer, number of trays, print resolution, etc. This information is then sent to spooling system 40 to allow client processor 15 to locate printer 30 based on such attributes. At this point, client processor 15 is now able to send print data to printer 30 via print server 20.

Referring back now for a moment to the determination 130, 135 (FIG. 2) of whether an entry already exists for printer 30 in cache 35, if an entry exists (i.e., the printer is not a new device on the network), then no change is made in cache 35. However, if some configuration parameters have changed 190 for printer 30 (as detected in the SLP reply packet information), but the printer model has not changed 192, then the spooler 40 configuration parameters are adjusted accordingly 195. For example, if an I/P address for printer 30 has changed, then the port address in spooling system 40 is modified accordingly.

On the other hand, if the printer model has changed 192, then a determination is made 145 (FIG. 3) as to whether the print driver for that new (changed) model is already registered in the spooler. If the driver for the changed model is not already registered 145, then steps are taken 150, 155, 160 to access and install the appropriate driver (as previously discussed). If the driver is already registered 145, then we simply ensure that a proper communication port 175 and print queue 180 are created, and we verify attribute information 185.

In either case, whether certain printer parameters are noted to have changed, or whether the printer model itself has changed, these processes discussed for capturing the changes represent a unique, dynamic updating capability of the present invention for automatically maintaining accurate network information for printer 30 on print server 20 without any user intervention.

Advantageously, the present invention enables new peripheral devices (such as printer 30) to be automatically seen on a network with the only user input requirement being to physically connect the printer to the network. Importantly, the printer driver is automatically configured on print server 20 without any user intervention, the port and queue for the printer are likewise automatically created, and printer configurations are dynamically and automatically updated for consistent, accurate network information.

In summary, the present invention provides an automatic configuration of a network peripheral device without user intervention. It will be obvious to one of ordinary skill in the art that the present invention is easily implemented utilizing any of a variety of components and tools existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of enabling a peripheral device on a network without user intervention, the network having a server node connected thereto, the method comprising:
   (a) the server node receiving identification data for identifying the peripheral device on the network; and,
   (b) upon detecting the received identification data, the server node self-installing a driver on itself for the peripheral device if the driver is not already installed on the server node.

2. The method of claim 1 wherein the peripheral device is selected from a printing device, digital copying device, or facsimile device.

3. The method of claim 1 wherein the step of self-installing the driver includes accessing a driver file for the peripheral device and registering the driver file with the server node.

4. The method of claim 3 wherein accessing the driver file includes accessing a storage device identified from a memory location in the server node, the storage device being identified as a source from which the server node was network enabled.

5. The method of claim 1 wherein the peripheral device is a printer and wherein the step of self-installing the driver includes registering the peripheral device with a spooling system associated with the server node.

6. The method of claim 1 further including, upon detecting the received identification data, the server node self-creating a communication line to the peripheral device.

7. The method of claim 6 wherein the communication line includes a communication port and a job queue for the peripheral device.

8. The method of claim 6 further including the server node self-establishing a network share status for the communication line.

9. The method of claim 1 wherein the identification data is received by the peripheral device having broadcast the identification data over the network.

10. The method of claim 1 further including the server node self-modifying to embody changed configuration parameters of the peripheral device as identified from the received identification data.

11. A computer-readable medium having computer-executable instructions for performing steps for enabling a peripheral device on a network having a server node connected thereto, including:
    (a) the server node receiving identification data for identifying the peripheral device on the network; and,
    (b) upon detecting the received identification data, the server node self-installing a driver on itself for the peripheral device if the driver is not already installed on the server node.

12. An system for enabling a peripheral device on a network without user intervention, the network having a server node connected thereto, the apparatus comprising:
    (a) means for enabling the server node to receive identification data for identifying the peripheral device on the network; and,
    (b) means for enabling the server node to self-install a driver on itself for the peripheral device upon detecting the received identification data.

13. The apparatus of claim 12 wherein the peripheral device is selected from a printing device, digital copying device, or facsimile device.

14. The apparatus of claim 12 wherein the means for enabling the server node to self-install the driver includes means for accessing a driver file for the peripheral device and registering the driver file with the server node.

15. The apparatus of claim 14 wherein the means for accessing the driver file includes accessing a storage device identified from a memory location in the server node, the storage device being identified as a source from which the server node was network enabled.

16. The apparatus of claim 12 wherein the peripheral device is a printer and wherein the means for enabling the server node to self-install a driver includes means for registering the peripheral device with a spooling system associated with the server node.

17. The apparatus of claim 12 further including means for enabling the server node to self-create a communication line to the peripheral device upon detecting the received identification data.

18. The apparatus of claim 17, further including means for enabling the server node to self-establish a network share status for the communication line.

19. The apparatus of claim 12 wherein the identification data is received by the peripheral device having broadcast the identification data over the network.

20. The apparatus of claim 12 further including means for enabling the server node to self-modify to embody changed configuration parameters of the peripheral device as identified from the received identification data.

21. A server node configured to enable a peripheral device on a network without user intervention, the server node comprising:
    (a) a processor coupled to a memory;
    (b) instructions stored in the memory and configured to be executed by the processor to receive identification data for identifying the peripheral device on the network; and,
    (c) further instructions stored in the memory and configured to be executed by the processor to install a driver for the peripheral device onto the server node in response to the identification data and without user intervention.

22. A server node configured to enable a peripheral device on a network without user intervention, the server node comprising:
    (a) executable instructions stored in a memory of the server node and configured to receive identification data for identifying the peripheral device on the network; and,
    (b) further executable instructions stored in the memory and configured to access and install a driver for the peripheral device onto the server node in response to the identification data and without user intervention, wherein the driver is accessed from a storage device that is identified as a source from which the server node was network enabled.

23. A network system comprising:
(a) a server node;
(b) a peripheral device coupled to the server node via a network; and,
(c) instructions stored on the server node configured to:

(i) receive identification data for identifying the peripheral device on the network; and,
(ii) automatically install a driver for the peripheral device onto the server node in response to the identification data and without user intervention.

* * * * *